US009503933B2

(12) United States Patent
Yang et al.

(10) Patent No.: US 9,503,933 B2
(45) Date of Patent: Nov. 22, 2016

(54) METHOD FOR COORDINATING ACCESS POINTS FOR BACKHAUL AGGREGATION IN A TELECOMMUNICATIONS NETWORK AND DEVICE

(71) Applicant: TELEFONICA DIGITAL ESPANA, S.L.U., Madrid (ES)

(72) Inventors: Xiaoyuan Yang, Madrid (ES); Diego Lopez Recas, Madrid (ES); Fernando Navarro, Madrid (ES); Yan Grunenberger, Madrid (ES)

(73) Assignee: TELEFONICA DIGITAL ESPANA, S.L.U., Madrid (ES)

( * ) Notice: Subject to any disclaimer, the term of this patent is extended or adjusted under 35 U.S.C. 154(b) by 85 days.

(21) Appl. No.: 14/528,234

(22) Filed: Oct. 30, 2014

(65) Prior Publication Data

US 2015/0117210 A1    Apr. 30, 2015

(30) Foreign Application Priority Data

Oct. 31, 2013   (EP) .................................... 13382438

(51) Int. Cl.
| H04W 4/00 | (2009.01) |
| H04W 28/08 | (2009.01) |
| H04W 84/12 | (2009.01) |
| H04W 24/02 | (2009.01) |
| H04W 84/22 | (2009.01) |
| H04W 88/08 | (2009.01) |

(Continued)

(52) U.S. Cl.
CPC .............. *H04W 28/08* (2013.01); *H04W 24/02* (2013.01); *H04W 84/12* (2013.01); *H04W 84/22* (2013.01); *H04W 88/08* (2013.01); *H04W 92/12* (2013.01); *H04W 92/20* (2013.01)

(58) Field of Classification Search
None
See application file for complete search history.

(56) References Cited

U.S. PATENT DOCUMENTS 6,772,199 B1   8/2004   Keller, Jr. et al.
8,442,003 B2   5/2013   Stamoulis et al.
(Continued)

FOREIGN PATENT DOCUMENTS

EP      2 263 398 B1    7/2013
WO   2007/103891 A2    9/2007
(Continued)

OTHER PUBLICATIONS

Domenico Giustiniano et al., "Fair WLAN Backhaul Aggregation", Proceedings of the Sixteenth Annual International Conference on Mobile computing and Networking, MOBICOM '10, Jan. 1, 2010, pp. 269-280, XP055011669.

(Continued)

*Primary Examiner* — Bob Pkunkulh
(74) *Attorney, Agent, or Firm* — Sughrue Mion, PLLC

(57) ABSTRACT

In the method, a plurality of access points forming a cluster in a telecommunication network monitors network data traffic information from at least one user computing device connected thereto; obtains a status profile; reports an own identifier to a remote server; builds, by using a record including the corresponding identifier of each access point, a list of access points available for performing backhaul aggregation; and establishes connections between available access points forming sub-clusters of access points. Wherein, one of the access points acts as a cluster coordinator coordinating said formed sub-clusters of access points for a backhaul aggregation.
The device is adapted to implement the method.

13 Claims, 3 Drawing Sheets

(51) Int. Cl.
  *H04W 92/12* (2009.01)
  *H04W 92/20* (2009.01)

(56) References Cited

U.S. PATENT DOCUMENTS

| | | | | |
|---|---|---|---|---|
| 2003/0191856 A1* | 10/2003 | Lewis | H04L 12/5692 | 709/241 |
| 2007/0177510 A1* | 8/2007 | Natarajan | H04W 36/22 | 370/238 |
| 2009/0059795 A1 | 3/2009 | Fonseca, Jr. et al. | | |
| 2009/0213730 A1 | 8/2009 | Zeng et al. | | |
| 2010/0056215 A1* | 3/2010 | Gorokhov | H04B 7/024 | 455/561 |
| 2011/0151877 A1* | 6/2011 | Tafreshi | H04W 36/18 | 455/442 |
| 2012/0202498 A1* | 8/2012 | Sachs | H04W 28/18 | 455/436 |
| 2013/0094425 A1* | 4/2013 | Soriaga | H04W 88/085 | 370/312 |
| 2013/0242748 A1* | 9/2013 | Mangalvedhe | H04W 24/02 | 370/241 |
| 2013/0294288 A1* | 11/2013 | Choi | H04L 47/745 | 370/254 |
| 2013/0310052 A1* | 11/2013 | Timus | H04W 72/0433 | 455/445 |
| 2014/0198659 A1* | 7/2014 | Vargas Bautista | H04W 28/08 | 370/236 |
| 2014/0248897 A1* | 9/2014 | Sfar | H04W 28/08 | 455/453 |
| 2015/0270877 A1* | 9/2015 | Hessler | H04W 48/20 | 370/329 |
| 2016/0037422 A1* | 2/2016 | Rost | H04W 36/22 | 370/331 |

FOREIGN PATENT DOCUMENTS

| | | |
|---|---|---|
| WO | 2009/039012 A1 | 3/2009 |
| WO | 2013/011088 A1 | 1/2013 |

OTHER PUBLICATIONS

European Search Report for EP 13 38 2438 dated Apr. 24, 2014.

* cited by examiner

METHOD FOR COORDINATING ACCESS POINTS FOR BACKHAUL AGGREGATION IN A TELECOMMUNICATIONS NETWORK AND DEVICE

FIELD OF THE ART

The present invention is directed, in general, to wireless communications, and more particularly to a method for coordinating Access Points for backhaul aggregation in a telecommunications network and a device for backhaul aggregation therefore providing a high-level distributed coordination/planning scheme for AP-based backhaul aggregation solutions.

BACKGROUND OF THE INVENTION

Wireless Local Area Network (WLAN) technology is being globally adopted in anyone's house as a must-have connectivity medium for our daily life. Driven by the market needs, subsequent WLAN protocol standards have be defined for medium access control and physical layer. IEEE released the original 802.11 protocol, RFC5416 in 1997 and up to six more versions have been published until then aimed to increase both the capacity and the signal coverage distance. In 2014, 802.11ad is published to provide a theoretical maximum data throughput of up to 7.0 Gbps.

Opposite of the fast WLAN technology development, consumer broadband Internet access technologies is experimenting a notable slowing down in new breakthroughs. The new ADSL2++ (52.0 Mbps downstream rate) is still in development after the last ADSL2+, RFC4706, version release in 2008. Although the fiber technology provides an alternative, the higher infrastructure deployment cost makes it less attractive for ISPs.

Motivated by the current trend in technology development and the economic incentives, new communication architecture designs have been proposed to combine existing WLAN and broadband technologies. The new combined solutions provide higher performance without requiring any new infrastructure deployments. For instance, Domenico Giustiniano et al "Fair WLAN Backhaul Aggregation"[1] proposed a client-based solution to aggregate the WLAN backhaul capacity with a virtualized WIFI antenna that is able to connect simultaneously to multiple APs. Such virtualized antenna enables WIFI devices (e.g.: laptop or phones) to connect with multiples APs at same time. Nevertheless, such antenna virtualization requires chipset support and specific driver development per device, which involves high and prohibitive costs in a massive adoption.

[1] "Fair WLAN Backhaul Aggregation", Domenico Giustiniano, Eduard Goma, Alberto Lopez Toledo, P. Rodriguez, ACM/MOBICOM'10, September 2010.

Patent application WO 2013/011088 proposes to aggregate backhaul capacities in an Access Point (AP) enabling one single-radio AP to behave both as a AP for home users and as a client of other neighboring APs that could be in different WALN channels. In order to connect to the neighboring APs, it was proposed to use Network Allocation Vector (NAV) to silence all clients, so have time to switch to other APs for data exchange.

In one hand, AP-based solutions have the advantage of providing backhaul aggregation without any modification in clients. In other hand, it involves remarkable coordination and planning challenges. For instance, each AP has to decide which neighbor APs should aggregate with. Allow all AP to collaborate with all neighboring APs is not a practical solution because it can degrade the performance of all involved WLAN networks. For instance, in WO 2013/011088 APs can switch off all neighboring WLANs by control frames. On more practical solution may be allocating all APs in the same channel, so avoid unnecessary switching offs. Such a solution, however, limits the total capacity of different neighboring WLANs and suffers WIFI well known problem in performance degradation because higher number of devices or long-distanced WIFI clients.

Patent EP-B1-2263398 proposes a routing scheme for mesh-network where multiples relay nodes are interconnected to access the Internet. The proposed scheme computes the best routing and bandwidth allocation according the collected network information. Similarly, U.S. Pat. No. 8,442,003 proposes to use information from different access points and backhaul throughput to select the best access point in a mesh-network. On contrary, present invention is focused on WLAN backhaul aggregation platforms and there are not relay nodes. Each of the nodes in the present invention has independent backhaul connection and the goal is optimize the overall utilization of all backhaul links.

U.S. Pat. No. 6,772,199 describes a QoS management framework where QoS information is broadcasted by different nodes with management frames in a mesh-network. Although QoS management is important for the well-functioning of the proposed aggregation scheme, present invention does not provide any QoS management. Thus U.S. Pat. No. 6,772,199 could be totally complementary to present invention.

In the context of mesh-network, there are also proposals related to transmission control, such as patent application WO-A2-2007/103891 where frameworks define when and how devices access the communication medium. The same problem is also inherent in present invention proposal and other WIFI-based systems. WO-A2-2007/103891 does also apply to present invention proposal.

SUMMARY OF THE INVENTION

According to a first aspect there is provided a method for coordinating Access Points for backhaul aggregation in a telecommunications network, comprising as commonly in the field: a) monitoring, by an access point in a telecommunication network, network data traffic information from at least one user computing device connected thereto; and b) detecting, by said access point, an adjacent access point in said telecommunication network available for performing backhaul aggregation.

On contrary of the known proposal, the method of the first aspect comprises: performing said steps a) and b) by a plurality of access points forming a cluster of access points; obtaining, by all the access points of the cluster, a status profile by using said network data traffic information monitored in step a) and by using information regarding said detected adjacent access points found in step b); reporting, by all the access points in said cluster, an own identifier to a remote server; obtaining, by said remote server, by means of said reporting, a record including the corresponding identifier of each access point; building, by all the access points in said cluster, by means of said obtaining, a list of access points available for performing backhaul aggregation; establishing connections between available access points forming sub-clusters of access points; and acting one of said access points as a cluster coordinator coordinating the formed sub-clusters of access points for a backhaul aggregation.

Each of said sub-clusters has a sub-cluster coordinator, which has been designated by means of a voting process performed by all the access points forming part of said sub-cluster.

The cluster coordinator on other hand is the access point most voted of said sub-cluster coordinators.

In addition, a sub-cluster reserve coordinator is also designated in the voting process. The sub-cluster reserve coordinator generally will be the second most voted access point in the voting process.

In an embodiment, the cluster coordinator comprises performing as part of the coordinating step: selecting from said sub-clusters at least one sub-cluster in charge of performing backhaul aggregation; and deciding between said selected sub-cluster the wireless channel through which performing said backhaul aggregation. Preferably, the sub-cluster is selected considering the network data traffic information and/or signal strength of the access points.

It could be de case that an access point belongs or forms part of different sub-cluster of access points. In this case, the access point has the option to decide in which sub-cluster of said different sub-clusters residing. Preferably, the access point decides to stay in the most loaded sub-cluster.

The remote server periodically checks the obtained record and further removes from the latter the access points that haven't been report the own identifier in a certain period of time.

The status profile obtained by each of the access points, in addition to the monitored network data traffic information and the information regarding said detected adjacent access points would preferably further include: status of the connected user computing device; estimation about network data traffic requirements; channel occupancy rate and noise level and network signal strength of the detected adjacent access points.

According to a second aspect there is provided a device for backhaul aggregation comprising as commonly known: means for monitoring network data traffic information from at least one user computing device connected thereto; means for detecting at least one access point available for performing backhaul aggregation; and means for establishing a control channel with at least said detected access point. On contrary of the known proposals, the device further comprises: means for obtaining a status profile; means for reporting an own identifier to a remote server; and means for at least acting as a cluster coordinator of a plurality of sub-clusters of said cluster for a backhaul aggregation.

In an embodiment, the device of the second aspect is an access point forming part of a same physical entity of an associated broadband router. Alternatively, in another embodiment, said device is an access point forming part of a different physical entity of said associated broadband router.

The device of the second aspect is adapted to implement the method of the first aspect.

BRIEF DESCRIPTION OF THE DRAWINGS

The previous and other advantages and features will be more deeply understood from the following detailed description of embodiments, with reference to the attached, which must be considered in an illustrative and non-limiting manner, in which.

DESCRIPTION OF THE INVENTION

Figure 1:
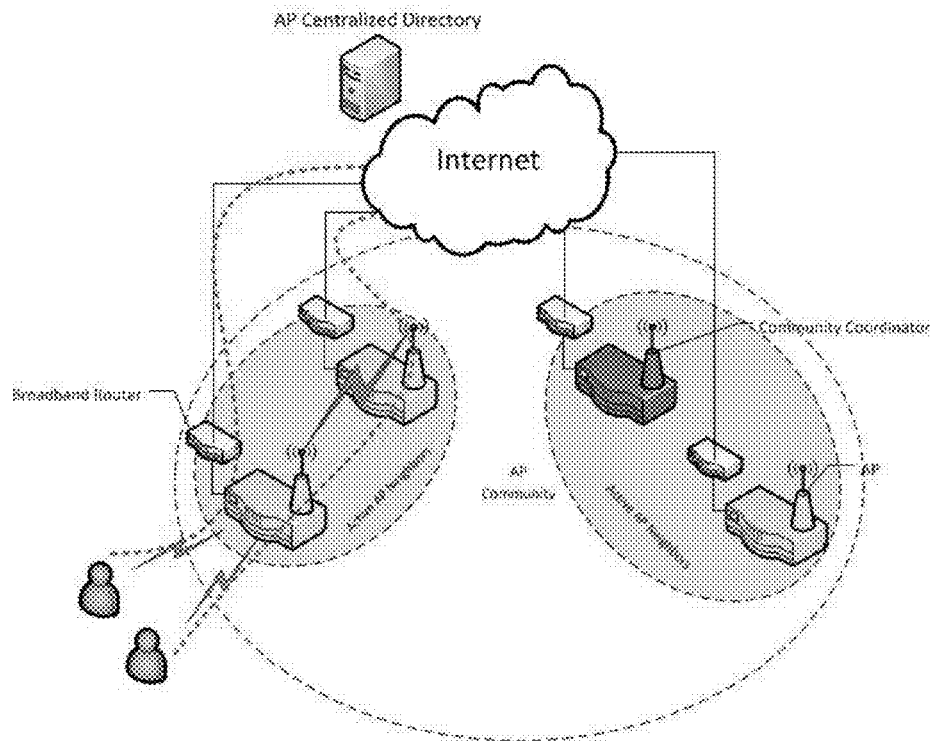
FIG. 1 is an illustration of the general architecture model for the proposed WLAN backhaul aggregation scheme.

The invention is composed by a set of control modules that run in the access points that perform WLAN backhaul aggregation, and a backend system that operates in the cloud. The control modules and the backend system work in collaboration to optimize the performance of backhaul aggregation FIG. 1 illustrates the general architecture model for the proposed WLAN backhaul aggregation scheme. The architecture model is composed by a set of access points APs, each access point AP being associated to a broadband router that provides the backhaul link. In an embodiment, the access point AP and the broadband router could be implemented as different physical entities or alternatively they could form part of a same physical entity.

Different access points APs can form an access point AP cluster or community and each community can contain multiple active access point AP sub-clusters or neighborhoods. An active access point AP neighborhood generally is composed by more than one access point AP, that share the backhaul links by sending the monitored home-users traffic to multiple links. The invention does not include any routing policy to guarantee the fairness between home-users. Proposals like [1] do apply here to solve the fairness problem.

Figure 2:
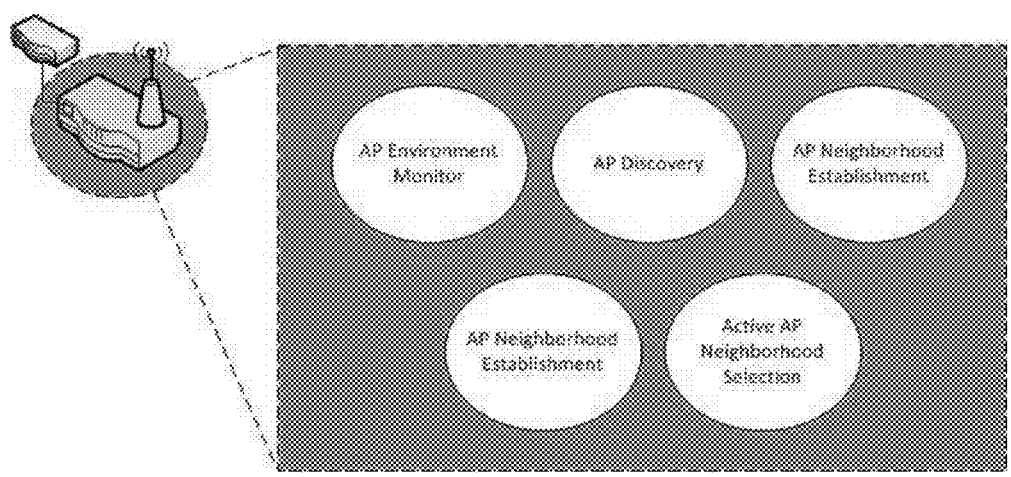
FIG. 2 is an illustration of the different modules that are included in each access point according to some embodiments.

In an embodiment, each access point AP cluster may include one or more cluster or community coordinators. The selection of coordinator is distributed and provides scalability and fault-tolerance FIG. 2 shows the different modules or means that may be included in each access point AP. Following, each of said different modules or means are described in more detailed.

AP Environment Monitor module: Each access point AP runs a module that constantly monitors the home-user traffic or network data traffic information and scans the WIFI environment of the cluster to generate a status profile. The status profile preferably includes: the status of home user connected devices, estimation about home users' traffic requirement, the channel occupancy rate and noise level and detected additional access points APs (visible neighboring APs) and signal strength of the same.

Figure 3:
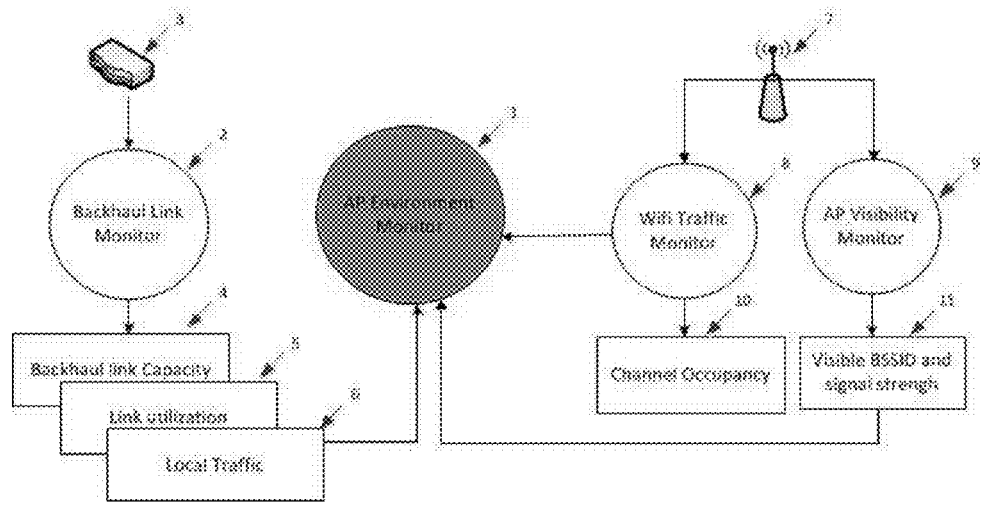
FIG. 3 is an illustration of the AP Environment Monitor module.

FIG. 3 illustrates the detail design of this AP Environment Monitor module. All monitored network data traffic information is collected by AP Environment Monitor module 1 to build the AP status profile. There are three other monitors that allow generating all required information. The Backhaul Link Monitor 2 which constantly monitors the backhaul traffic and generates information regarding: Backhaul link Capacity 4, Link Utilization 5 and Local Traffic 6. In order to measure the link capacity, periodical prove packets are generated to well-known speed test servers. Passive measurement techniques may also be used to provide a more accurate estimation.

Link utilization is measured by counting the traffic to the broadband router and entire network traffic are divided to local home-user traffic and remote user traffic. Wifi Traffic Monitor 8 calculates the Channel Occupancy 10 in all available channels by performing periodical samplings. AP Visibility Monitor 9 generates the list of visible APs (Basic Service Set Identifier BSSIDs) with the correspondent information about signal strength.

AP Discovery module: All access points APs in the present invention has its own backhaul link and each of them has to talk with other to exchange information. In order to perform this, each access point AP establishes backhaul communication channels with other neighboring access points APs. AP Discovery module provides the mechanism to known the public IP address of each access point AP.

Figure 4:
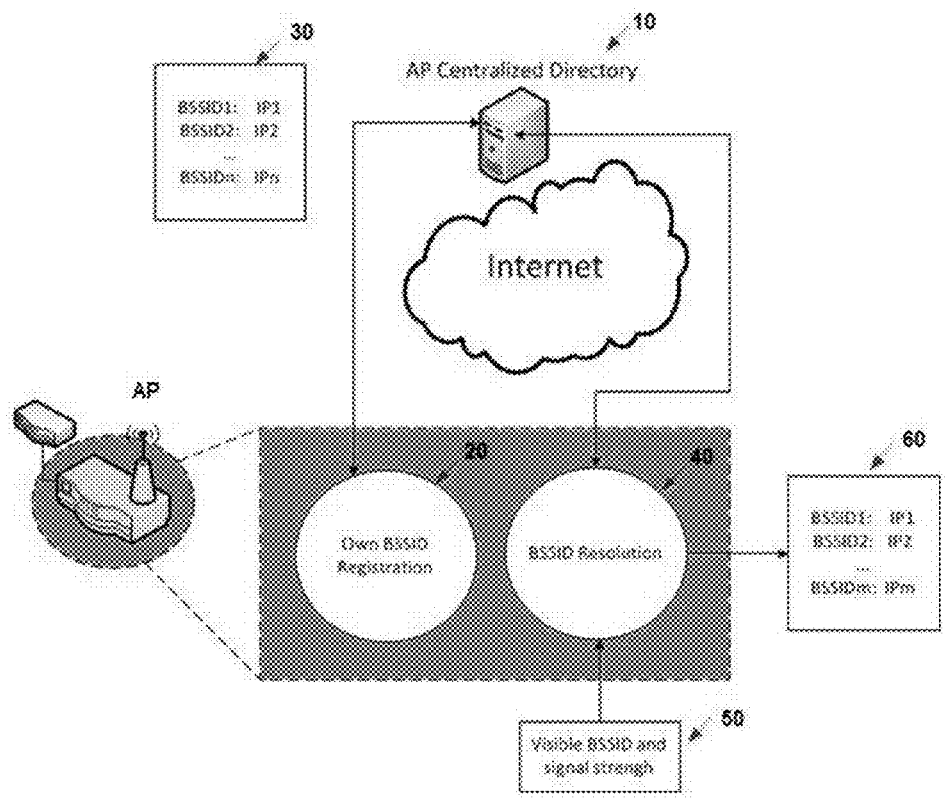
FIG. 4 is an illustration of the AP Discovery module.

FIG. 4 illustrates the detail design of this AP discovery module. Each access point AP periodically connects 20 to a remote server or AP Centralized Directory 10 to report the own identifier or BSSID. The AP Centralized Directory 10 then builds a map or record 30 to store the public IP address correspondent to each BSSID. In an embodiment, all entries in said record 30 are periodically checked, so APs that haven't reported its BSSID in more than a determined period of time are removed from the record. Preferably, the value of said determined period of time is ten minutes, but it could be any other. Then, given the list of visible BSSIDs 50, the BSSID Resolution 40 module connects to the AP Centralized Directory 10 to retrieve the correspondent public IP address. At end of the entire process, the list of all visible IPs 60 is built in each AP.

AP Neighborhood Establishment module: All pairs of two mutually visible access points APs are neighbors or what is the same they form part of the same sub-cluster. In order to know that two access points APs see each other, control channels are established between each pair of access points APs. For instance, if an AP-A doesn't see other AP-B that is trying to establish the control channel, the AP-A refuses the connection.

Figure 5:
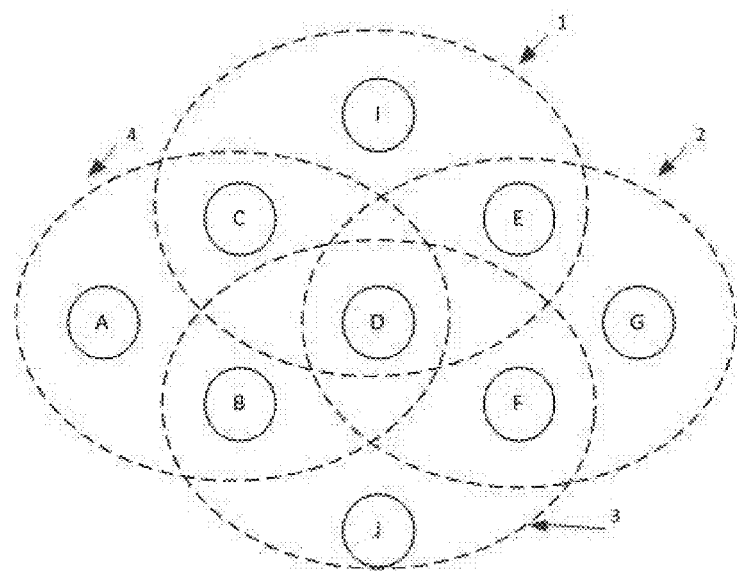
FIG. 5 illustrates an example in which an access point is mutually visible in four different sub-clusters.

There are situations that an access point AP can belong to multiple possible sub-clusters or neighborhoods. FIG. 5 shows an example where nine access points APs are mutually visible in four different sub-clusters. While AP-A can only see C-B-D, AP-C can see nodes that are not visible for AP-A, for install node I. In such situation, C can choose which sub-cluster or neighborhood will belong to. Similar situation happens to AP-D that can choose four different neighborhoods.

In order to decide which AP sub-cluster belongs to, each access point AP may choose first randomly to stay to one of the sub-clusters. For other sub-clusters, access point AP will report to be "abroad". When an access point AP is in abroad, non-access point AP will select it to forward the traffic, but all other control information will be propagated to the access point AP.

Periodically, each access point AP that could belong to multiple sub-clusters calculates the traffic in each sub-cluster and as a preferred option selects the most loaded sub-cluster to stay with. The idea is to contribute the backhaul capacity to those sub-clusters that really need them.

Neighborhood Coordinator Selection module: For each sub-cluster or neighborhood, an access point AP will be selected to be the main coordinator. The cluster or community coordinator is on charge of coordinating entire community to provide the optimal performance. In order to provide fault-tolerance, a sub-cluster reserve coordinator may also be selected.

The sub-cluster coordinator is designated by means of a voting process performed by all the access points forming part of said sub-cluster. In said voting process, each access point AP randomly votes two access points APs to be coordinators. The one access point AP that got more votes will be selected to be the main sub-cluster coordinator and the second one will be the sub-cluster reserve coordinator. On the other hand, the cluster or community coordinator is the access point most voted of said sub-cluster coordinators.

Active AP Neighborhood Selection module: One of the tasks of the cluster or community coordinator is the active sub-cluster or neighborhood selection. The cluster coordinator decides the subset of access points APs inside the cluster that actively performs backhaul aggregation. The result of this process is isolated sub-clusters of access points APs that share backhaul connections. The cluster coordinator mainly uses traffic statistics of all access points APs to avoid sub-clusters with more than one heavy user. The idea is to optimize the aggregation opportunity in each sub-cluster.

The cluster coordinator does also can decide the wireless channels that each sub-cluster has to use. The idea is to distribute the per-channel occupancy and optimized the WLAN performance.

Figure 6:
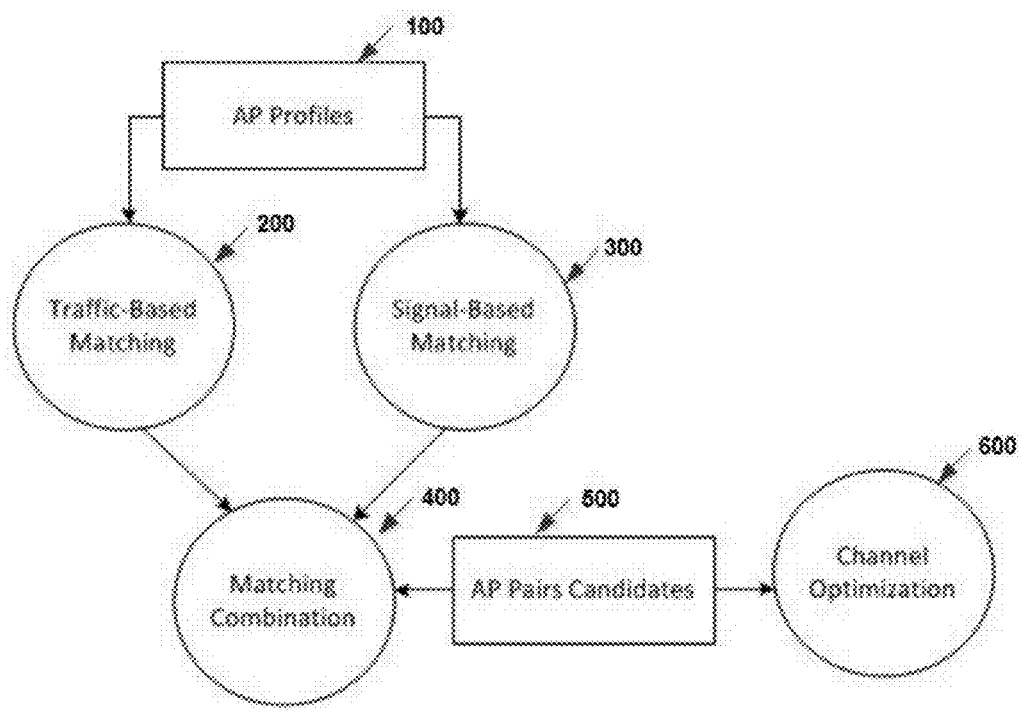
FIG. 6 illustrates the active AP sub-cluster selection process according to an embodiment of the present invention.

FIG. 6 illustrates the entire process of the said active AP neighborhood selection. Based on AP status profiles 100, which was generated for all the access points APs included in the cluster, two competitive and independent modules 200 and 300 propose different access point AP pairs candidates. Module 200 selects access points APs according to the network data traffic information (the local home-user traffic). The idea is to match pairs of access points APs with different traffic load. Module 300, in other hand, selects pairs with strong signal strength. The idea is to optimize the Wifi throughput. The output of module 200 and 300 are a list of AP-pairs with a value between (0.0-1.0) that evaluates the goodness of each pair. Module 400 then combines both results to generate the final access point AP pair's candidates 500. Once the access point AP pairs are selected, channel optimization module 600 establishes channels that pair of access points APs should use. The idea is to avoid signal interference between channels.

Different design aspects of the invention provide a feasible scalable solution to coordinate multiple access points APs for backhaul aggregation. The cluster or community coordination mechanism is entirely distributed and only a small piece of information is required to be stored in the AP centralized directory 1. The invention design guarantees the scalability to a large number of access points APs. Fault-tolerance is also provides by selecting multiple coordinators inside each cluster.

The active neighboring AP selection module coordinates one AP cluster to use efficiently multiple wireless or Wifi channels, thus reduce the contention in each Wifi channel. Furthermore the mechanism optimizes the backhaul bandwidth efficiency by pairing heavy home-users with others with less traffic. The overall result is better local WLAN performance while optimizes backhaul connection utilization.

The scope of the invention is given by the appended claims and all variations and equivalents which fall within the range of the claims are intended to be embraced therein.

The invention claimed is:

1. A method for coordinating access points for backhaul aggregation in a telecommunications network, the method comprising a plurality of access points forming a cluster performing steps comprising:

a) monitoring, by an access point in said telecommunication network, network data traffic information from at least one user computing device connected thereto; and b) detecting, by said access point, at least one adjacent access point in said telecommunication network available for performing backhaul aggregation, wherein the method further comprises:

obtaining, by all of the plurality of access points in said cluster, a status profile by at least using said network data traffic information monitored in step a) and by using information regarding said detected adjacent access points found in step b);

reporting, by all of the plurality of access points in said cluster, an own identifier to a remote server;

obtaining, by said remote server, by said reporting, a record including a corresponding identifier of each of the plurality of access points in said cluster;

building, by all of the plurality of access points in said cluster, by said obtaining, a list of access points available for performing backhaul aggregation;

establishing connections between available access points forming sub-clusters of access points; and one of said access point acting as a cluster coordinator coordinating said formed sub-clusters of access points for a backhaul aggregation, and wherein each of said sub-clusters comprises a sub-cluster coordinator, said sub-cluster coordinator being designated by a voting process performed by the plurality of access points of said sub-cluster, and said cluster coordinator being a most voted of said sub-cluster coordinators.

2. The method according to claim 1, further comprising in said voting process designating a sub-cluster reserve coordinator, said sub-cluster reserve coordinator being a second most voted access point in the voting process.

3. The method according to claim 1, wherein the cluster coordinator, in said coordinating step:

selects from said sub-clusters at least one sub-cluster in charge of performing backhaul aggregation; and decides between said selected sub-cluster a wireless channel through which said backhaul aggregation is performed.

4. The method according to claim 3, wherein said sub-cluster is selected considering the network data traffic information and/or signal strength of each of the plurality of access points.

5. The method according to claim 1, wherein different sub-clusters of access points share a same available access point, said same available access point deciding in which sub-cluster of said different sub-clusters residing.

6. The method according to claim 5, wherein said decided sub-cluster has a highest traffic load among said other different sub-clusters.

7. The method according to claim 1, wherein said status profile further includes:

status of said at least one connected user computing device;

estimation about network data traffic requirements;

channel occupancy rate and noise level; and signal strength of the detected access points.

8. The method according to claim 1, wherein said monitoring of the network data traffic information is continuously performed.

9. The method according to claim 1, wherein said reporting of the own identifier is periodically performed.

10. The method according to claim 1, wherein said remote server periodically checks said obtained record and further removes from said obtained record the access points that have not been included in said reporting in more than a certain period of time.

11. A device for backhaul aggregation, the device comprising:

a network data traffic information monitor configured to monitor network data traffic information from at least one user computing device connected thereto;

an access point detector configured to detect at least one access point available for performing backhaul aggregation; and a control channel establisher configured to establish a control channel with at least said detected access point, wherein the device further comprises:

a status profile obtainer configured to obtain a status profile;

an own identifier reporter configured to report an own identifier to a remote server; and a cluster coordinator configured to act as a cluster coordinator of a plurality of sub-clusters of said cluster for a backhaul aggregation, and wherein:

each of said sub-clusters comprises a sub-cluster coordinator, said sub-cluster coordinator being designated by a voting process performed by the plurality of access points of said sub-cluster, and said cluster coordinator being a most voted of said sub-cluster coordinators.

12. The device according to claim 11, wherein said device is an access point forming part of a same physical entity of an associated broadband router.

13. The device according to claim 11, wherein said device is an access point forming part of a different physical entity of said associated broadband router.

* * * * *